(12) United States Patent
Mostyn

(10) Patent No.: US 6,462,763 B1
(45) Date of Patent: Oct. 8, 2002

(54) METHOD, SYSTEM, AND SOFTWARE FOR TRACKING MOVING HOTSPOTS WITH A STATIC OR MOVING CURSOR

(75) Inventor: Michael P. Mostyn, Flower Mound, TX (US)

(73) Assignee: Spotware Technologies, Inc., North Sioux, SD (US)

( * ) Notice: Subject to any disclaimer, the term of this patent is extended or adjusted under 35 U.S.C. 154(b) by 0 days.

(21) Appl. No.: 09/382,285

(22) Filed: Aug. 24, 1999

(51) Int. Cl.$^7$ ............................................... G06F 3/00
(52) U.S. Cl. ..................... 345/856; 345/848; 345/849; 345/852; 345/764
(58) Field of Search .............................. 345/764, 808, 345/856, 861, 848, 849, 852

(56) References Cited

U.S. PATENT DOCUMENTS

| | | | |
|---|---|---|---|
| 5,124,942 A | 6/1992 | Nielsen et al. ............... | 395/100 |
| 5,257,349 A | 10/1993 | Alexander ................... | 395/159 |
| 5,404,440 A | 4/1995 | Asahi .......................... | 395/155 |
| 5,436,637 A * | 7/1995 | Gayraud et al. ............. | 345/705 |
| 5,485,197 A | 1/1996 | Hoarty ........................... | 348/7 |
| 5,526,520 A | 6/1996 | Krause ....................... | 395/600 |
| 5,546,528 A | 8/1996 | Johnston ..................... | 395/159 |
| 5,555,354 A | 9/1996 | Strasnick et al. ........... | 395/127 |
| 5,590,262 A | 12/1996 | Isadore-Barreca .......... | 395/806 |
| 5,638,523 A | 6/1997 | Mullet et al. ................ | 395/326 |
| 5,640,560 A | 6/1997 | Smith .......................... | 395/615 |
| 5,640,590 A | 6/1997 | Luther ......................... | 395/806 |
| 5,644,686 A | 7/1997 | Hekmatpour ................ | 395/50 |
| 5,678,015 A | 10/1997 | Goh ............................ | 395/355 |
| 5,696,885 A | 12/1997 | Hekmatpour ................ | 395/54 |
| 5,704,051 A | 12/1997 | Lane et al. .................. | 395/357 |
| 5,708,845 A * | 1/1998 | Wistendahl et al. ..... | 707/500.1 |
| 5,724,492 A | 3/1998 | Matthews, III et al. ..... | 395/119 |
| 5,742,779 A | 4/1998 | Steele et al. ................ | 345/349 |
| 5,767,854 A | 6/1998 | Anwar ......................... | 345/355 |
| 5,801,707 A | 9/1998 | Rolnik et al. ............... | 345/429 |

OTHER PUBLICATIONS

US 5,807,704, 9/1998, Oohara et al. (withdrawn)

* cited by examiner

Primary Examiner—John Cabeca
Assistant Examiner—Kieu D. Vu
(74) Attorney, Agent, or Firm—William J. Breen

(57) ABSTRACT

A method, system, propagated signal, and software for tracking and identifying moving hotspots allows a user to keep a cursor stationary in a display without causing the cursor to lose any functionality. A dialog box or other highlighting option will result in response to the static cursor co-occupying overlapping regions on the display with a moving hotspot of an animated menu, or a menu in motion. In an animated menu configured with extensive or rapidly moving hotspots, the present invention enables a user to wait for a hotspot to come to the cursor for detection and selection, rather than having to pursue the hotspot such that the cursor recognizes the target as a hotspot.

25 Claims, 8 Drawing Sheets

METHOD, SYSTEM, AND SOFTWARE FOR TRACKING MOVING HOTSPOTS WITH A STATIC OR MOVING CURSOR

FIELD OF THE INVENTION

The present invention relates generally to graphical user interfaces and, more particularly, to graphical user interfaces employing menus in motion.

BACKGROUND OF THE INVENTION

The utility that has spawned the popularity of computers today is the graphical user interface, or GUI. As is well known, GUIs offer the user an array of options, typically in the form of icons, which are selected, and the underlying applications executed, with the aid of a cursor controlled by a pointing device such as a mouse. In many GUIs today, there is such a myriad of graphics and text, that it is easy to become confused as to which are selectable options that can be executed, and which are just images placed in the display to make the operating environment more visually appealing to the user. To overcome this confusion, many cursors have a function integrated into them that will present a response when the user moves the cursor over, or onto, an option that is selectable. The cursor, in these systems, will not respond if the user moves the cursor over an object that is displayed merely for looks. A typical response from the cursor attempting to identify these selectable options, or hotspots, is a screen pop which is a dialog box typically containing text identifying the application or function available from the selectable option or hotspot. Although this helps the user to a certain extent, there remains a problem with newer, more advanced GUI technology.

With the advent of animated menus, or menus in motion, the user can now see a myriad of options scrolling, or spinning, by them in the display. This method of displaying enables a GUI to present more options to a user while occupying the least amount of display space real estate possible. The problem with this combination of displaying options and the current means by which a cursor is enabled to respond, is that it does not maximize the capabilities of their union. In GUIs today, the cursor must be moved onto a hotspot for the cursor's response which identifies that location as a hotspot to occur. Without this cursor movement being processed by the system, if a hotspot were to scroll or spin under a cursor at rest, there would be no response from the cursor and therefore that option would not appear selectable. To maximize the capabilities of the union between the animated display and the cursor notification utility, a system would need to monitor the location of the cursor as well as know what areas of the moving display are selectable and where those locations are with respect to the cursor's location. By allowing a static cursor to detect these moving hotspots, not only is the utility of the animated menu increased, but it also makes it possible for a user to park the cursor and wait for a desired option to scroll to the cursor at which point the cursor will respond in recognition of the hotspot and further allow the user to select the desired option. This added functionality would allow a user to either chase down moving hotspots, or wait for them to cycle to a parked cursor for selection.

What is needed is a method, a system, a propagated signal, and software for detecting a cursor's position without any user interference or input, keeping track of the locations of selectable options in a display, comparing the locations of both the cursor and the selectable options, and enabling the cursor to respond when the comparison yields an overlap of the locations of each.

SUMMARY OF THE INVENTION

Accordingly, the present invention provides a method comprising the actions of maintaining at least one target on at least a portion of a display, maintaining a cursor on at least a portion of the display, moving the at least one target about the display, and tracking the position of the moving target on the display relative to the position of the cursor on the display.

The present invention further provides a computer readable medium tangibly embodying a program of instructions comprising the actions of maintaining at least one target on at least a portion of a display, maintaining a cursor on at least a portion of the display, moving the at least one target about the display, and tracking the position of the moving target on the display relative to the position of the cursor on the display.

The present invention also provides a system comprising at least one processor, memory operably associated with said processor, a cursor control device configured to control a cursor on a display, and a program of instructions comprising the actions of maintaining at least one target on at least a portion of the display, maintaining the cursor on at least a portion of the display, moving the at least one target about the display, and tracking the position of the moving target on the display relative to the position of the cursor on the display.

The present invention also provides a signal embodied in a propagation medium comprising at least one instruction configured to maintain at least one target on at least a portion of a display, at least one instruction configured to maintain a cursor on at least a portion of the display, at least one instruction configured to move the at least one target about the display, and at least one instruction configured to track the position of the moving target on the display relative to the position of the cursor on the display.

It is an object of the present invention to provide a method for tracking moving hotspots with a static cursor.

It is an object of the present invention to notify the user of a moving hotspot by highlighting the object representing the hotspot.

The present invention provides the advantage of allowing a static cursor or moving cursor to identify moving hotspots.

The present invention further provides the advantage of highlighting a hotspot when a moving hotspot comes into contact with a static or moving cursor.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiment and other embodiments according to the present invention, reference is made to the accompanying drawings that form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and/or electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
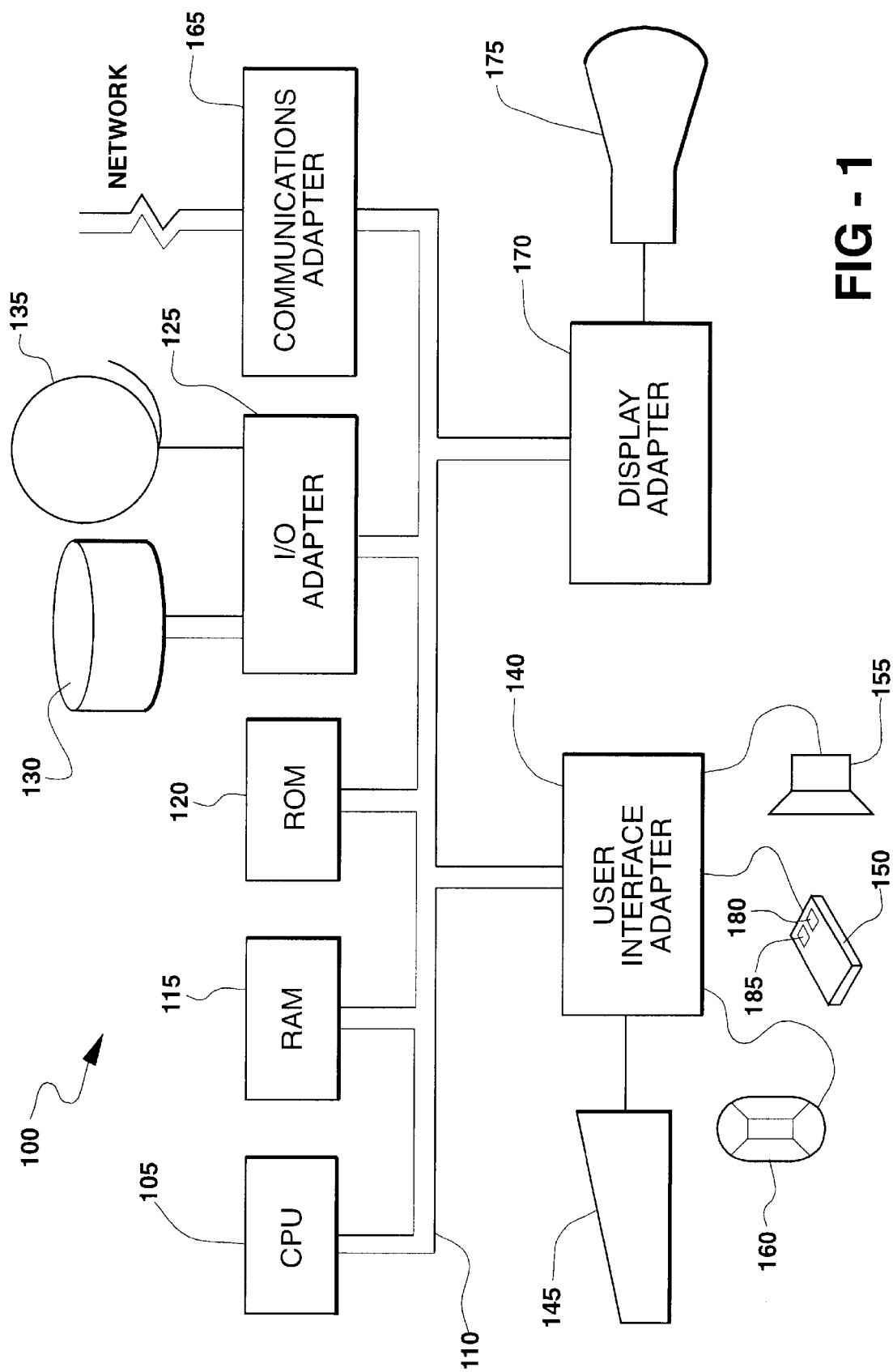
FIG. 1 illustrates a detailed block diagram showing a computer system according to a preferred embodiment of the present invention.

A representative hardware environment for practicing the present invention is depicted in FIG. 1, which illustrates a typical hardware configuration of an information handling system 100 in accordance with the present invention, having a central processing unit (CPU) 105, such as a conventional microprocessor, and a number of other units interconnected via at least one system bus 110. Information handling system 100 may be, for example, a portable or desktop Gateway computer or a Gateway Destination system (Gateway and Destination are trademarks of Gateway, Inc.). Information handling system 100 shown in FIG. 1 includes random access memory (RAM) 115, read only memory (ROM) 120, and input/output (I/O) adapter 125 for connecting peripheral devices such as a disk unit 130 and a tape drive 135 to system bus 110, a user interface adapter 140 for connecting a keyboard 145, a mouse 150, a speaker 155, a microphone 160, and/or other user interface devices to system bus 110, a communications adapter 165 for connecting information handling system 100 to an information network such as the Internet, and display adapter 170 for connecting system bus 110 to a display device such as monitor 175 having a display screen. The mouse 150 typically has a first button and a second button, 180 and 185 respectively, and is used to control a cursor (not shown) displayed on the monitor 175.

Figure 2:
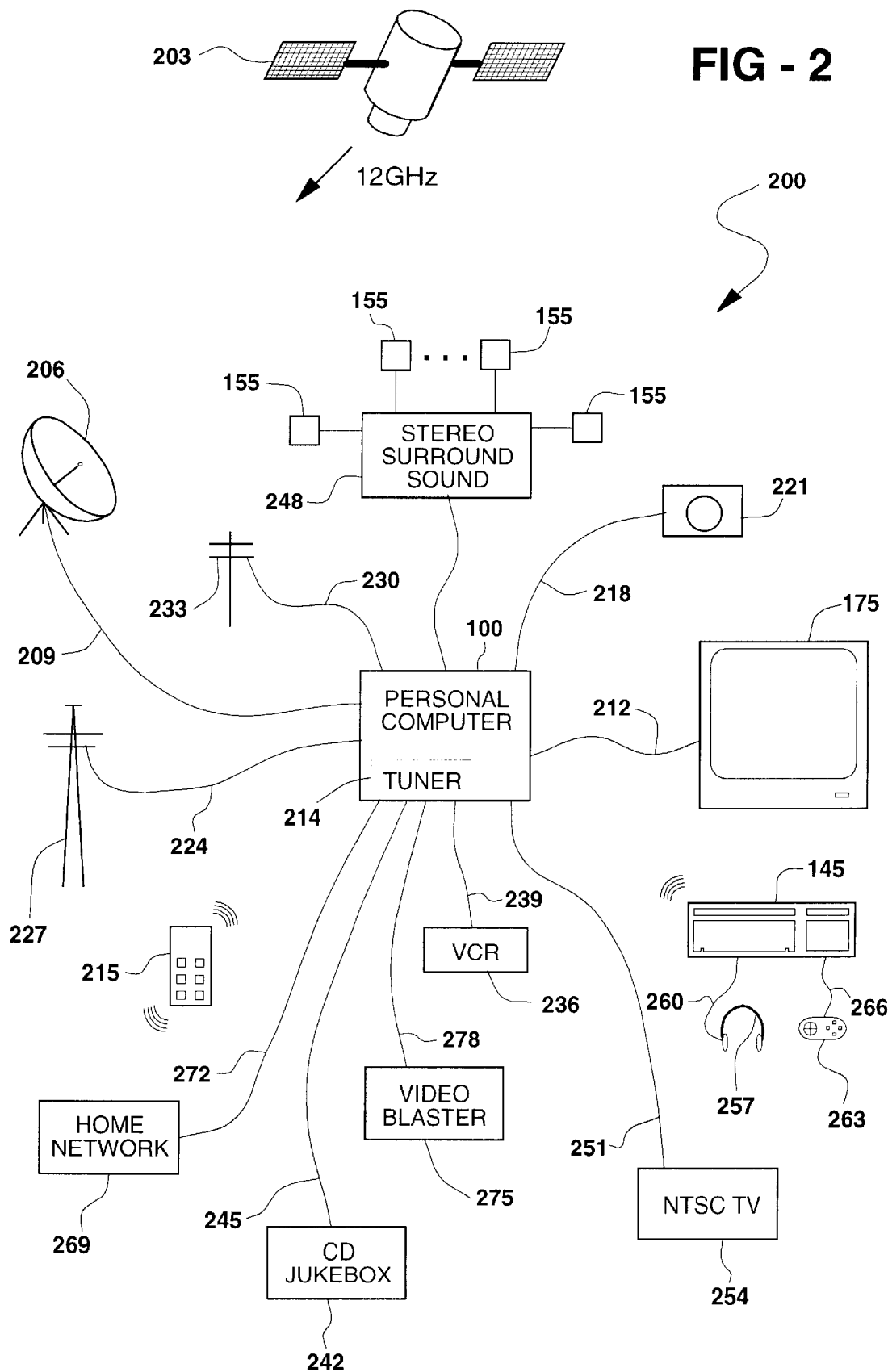
FIG. 2 illustrates a detailed block diagram showing a convergence system according to a preferred embodiment of the present invention.

Referring next to FIG. 2, a home entertainment or convergence system, such as the Gateway Destination System mentioned above, is shown generally at 200. Reference numerals or letters in FIG. 2 which are like, similar, or identical to the reference numerals or letters of FIG. 1 indicate like, similar, or identical components or features. External to convergence system 200, is satellite 203, which in one preferred embodiment is an HS601 model, operated by Hughes at a 101 degree west longitude geosynchronous orbital location, transmits signals comprising 150 channels of modulated digital video, audio, and data at a frequency of about 12 GHz. The satellite signals are received by home entertainment system 200 by antenna 206 containing a low noise block converter amplifier. Antenna 206 is preferably about 18 inches in diameter and receives left and right hand circularly polarized signals between 12.2 and 12.7 GHz. Antenna 206 provides a "downconverted-spectrum" signal between 950 and 1450 MHz via a coaxial cable or other suitable communication medium 209 to information handling system 100, such as a personal computer or other system or circuitry capable of processing data. Suitable antennas 206 are already being manufactured and sold by RCA Corporation by direct sales and through numerous major retail chains such as Radio Shack.

System 100 contains circuitry and software to further process signals from the antenna, generally demodulating and decoding the signal to produce a VGA (video graphics adapter) signal. The VGA signal is provided via standard VGA compatible monitor cable to drive large screen data quality monitor 175 suitable for viewing in a family room or entertainment room environment. System 100 provides for user input by means of remote controls 215 and 145. Remote control 215 comprises a handheld size device with standard television controls and a numeric keypad, and in one embodiment, VCR (video cassette recorder) controls and a pointing device. It provides RF (radio frequency) or IR (infrared) control signals received by system 100. Remote control 145 is a full function personal computer keyboard, with additional standard television and VCR controls, a pointing device which is preferably in the form of a touchpad, and it also provides RF control signals to system 100. RF control signals were selected over IR or hardwired in one embodiment due to its benefits in a home entertainment environment. It allows the system to be in a different room from monitor 175, or if in the same room, a clear line of sight is not required. In another embodiment, IR control signals were selected because the standard circuitry is available at a low cost. Monitor cable 212 is a standard type cable typically used on VGA display devices, and comprises up to fifteen electrical conductors, interfacing with monitor 175 in a D-series shell connector. In one embodiment, full multimedia sourcing and destinationing of audio/video/data (A/V/D) broadcast is provided for.

Information handling system 100 may include a tuner, tuner circuitry 214, or card capable of both tuning to multiple channels and receiving television information or signals in the form of the NTSC (National Television Standards Committee) or PAL (Phase Alteration Line) forms, from any medium such as from a cable system or from a digital satellite system. One embodiment of the signal on cable 209 from satellite dish 206 provides digital A/V/D signals from such sources as DirecTV or Primestar (DirecTV and Primestar are trademarks of their respective companies). In another such embodiment, the signal on cable 209 provides analog A/V such as NTSC antenna signals. In another such embodiment, the signal on cable 218 from camera 221 provides analog A/V such as NTSC audio/video signals. In further embodiments, the signal on cable 224 from cable-data source 227 provides analog and/or digital AIV/D. In further such embodiments, the signal on cable 230, from PSTN (Public Switched Telephone Network) 233, provides data or phone signals such as ISDN (integrated services digital network) or POTS (plain old telephone system) signals. In one set of such embodiments, system 100 is programmed to automatically record analog signals, such as television programming, onto recordable media, such as a video tape in VCR 236 coupled to cable 239. In another such set of embodiments, system 100 is programmed to automatically record digital signals, such as digital television programming or CD-ROM (Compact Disk—Read Only Memory) type audio, onto recordable media, such as recordable compact disks, in CD jukebox 242 coupled to cable 245. CD jukebox 242 also plays CDs or CD-ROMs for use elsewhere. In another such embodiment, signals are sent to stereo surround sound system 248 for audio output to one or more speakers 155, and on cable 251 to TV 254. In one such embodiment, earphones 257 on cable 260 and gamepad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 266 are examples of connections that are capable of being wired coupling or wireless, such as RF or IR.

One example of convergence system 200 is the Destination System using the DestiVu user interface manufactured and sold by Gateway, Inc. In this manner, convergence system 200 is a fully functional computer integrated with a television, providing TV viewing (via broadcast, cable, satellite, VCR, digital disk, or other broadcast media) and personal computing functionality. This convergence of computer and television enables a user the combined access to both television programs and information, as well as computer related functionality such as computer information and programs, and Internet access.

Although many of today's televisions employ much of the same hardware resources employed by computers, such as information handling system 100, it is possible that the present invention might be practiced in other electronic devices or networked electronic devices. For example, with the development of audio/video networking, such as the recently proposed HAVi standard, television sets or other audio/video devices, such as audio/video receivers and VCRs, that do not themselves contain such resources, could implement the present invention by using the resources of other devices on a network.

Figure 3:
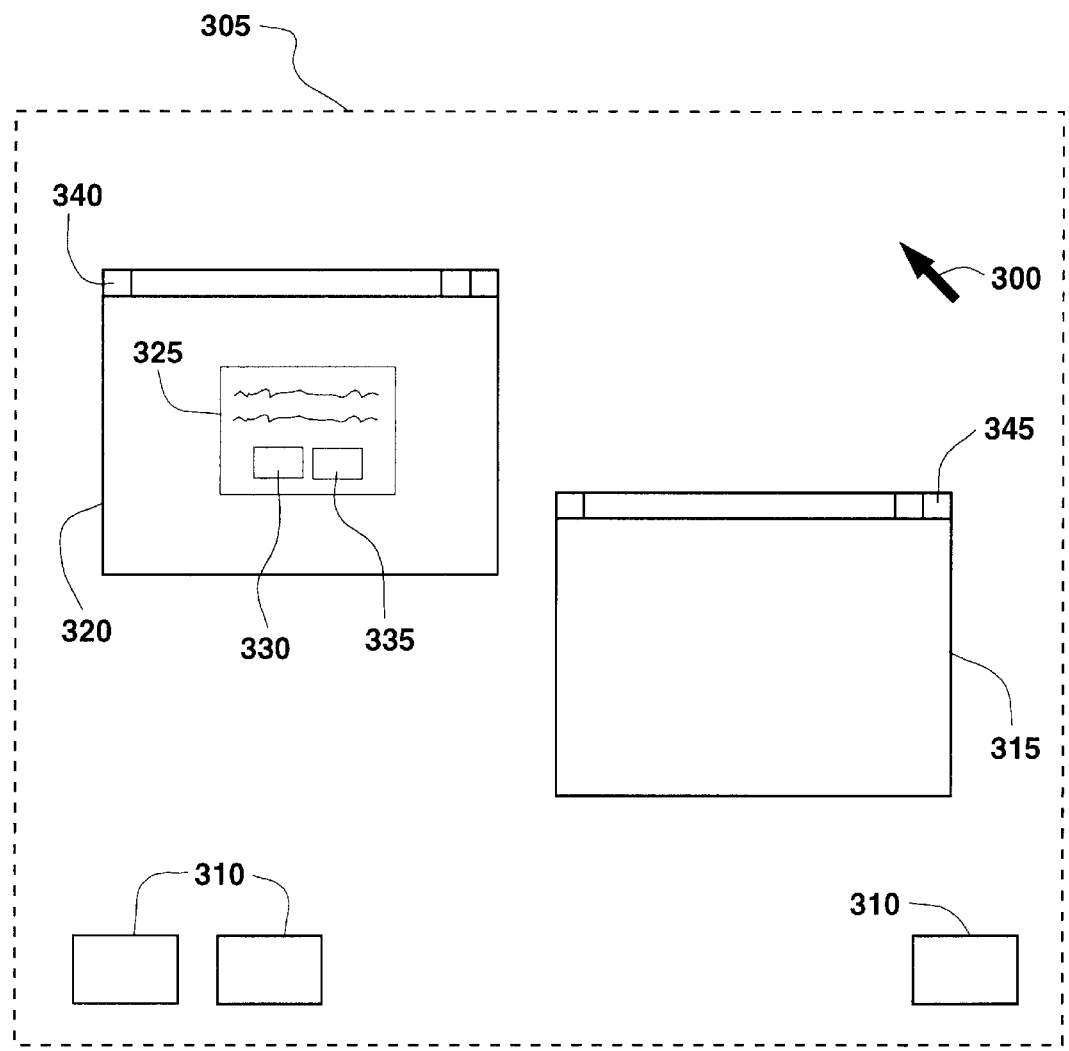
FIG. 3 shows the desktop of a computer operating system's user interface, typically employed on a computer system as in FIGS. 1 and 2, according to a preferred embodiment of the present invention.

Referring next to FIG. 3, a detail of an operating system's user interface as is typically displayed on monitor 175 in accordance with the present invention is illustrated.

Reference numerals or letters in FIG. 3 which are like, similar, or identical to the reference numerals or letters of FIGS. 1–2 indicate like, similar, or identical components or features. The operating system shown in FIG. 3 is IBM's OS/2 (OS/2 is a trademark of International Business Machines Corporation). However, the present invention will work with DestiVu, Windows 98, Windows 95 (DestiVu is a trademark of Gateway, Inc. and Windows 98 and Windows 95 are trademarks of Microsoft Corporation), or any other user interface. This user interface includes cursor 300, desktop 305, three icons 310, a first window and a second window, 315 and 320 respectively, and a dialog box 325. Dialog box 325 further contains a first button and a second button, 330 and 335 respectively. Programs are represented by the user interface as either icons 310 or windows 315 or 320. The horizontal region along the top of the first and second windows 315 and 320 are called the first title bar and second title bar, 340 and 345 respectively. A program window 315 or 320 has the "focus" when it has been designated by the user or by the operating system to receive input from keyboard 145 or mouse 150. In OS/2®, the user gives the window focus by clicking a mouse button 180 or 185 when cursor 300 is inside that window. Some operating systems, however, give a window the focus merely whenever cursor 300 is present within that window. The operating system indicates which program has the focus by changing the color of the focused window's title bar 340 or 345.

The present invention, in a preferred embodiment, is implemented as a program of instructions, and therefore the following detailed description assumes this implementation. As anticipated by the present invention, many different modules and many different sequences of code can be implemented to achieve implementation of the functions detailed herein as well as is the possibility of and/or for generating hardware specific coding allowing for the optimization of those hardware resources. With this in mind, the following detailed description avoids discussing any specific modules or sequences of code and only details the implementation of the functions by which the present invention, in a preferred embodiment, can be practiced.

To better understand the present invention, it is first necessary to understand, at least fundamentally, how a typical mouse 150 functions. The mouse 150 hardware is typically operated within system 100 by software called mouse 150 drivers. In order for a mouse 150 signal to be processed, the system must first detect a signal, determine it to be a mouse 150 event or signal, and then access the mouse 150 driver software to understand what that signal means. In other words, if mouse 150 is not generating an event, either by clicking buttons 180 or 185, or by cursor 300 movement controlled by the mouse 150, then the cursor 300 has previously gone unrecognized by the system 100. This lack of recognition of cursor 300 by system 100 results in none of the cursor 300 functions, such as dialog boxes that result from cursor hovering and the like, from being processed and displayed by system 100. An extended period of non-movement renders cursor 300, and its functions, invisible to system 100 until another mouse event occurs.

While employing traditional GUIs, mouse 150 inactivity is not a problem. However, when employing a GUI which provides animated menus, or menus in motion, comprising hotspots within those animated menus, a cursor 300 that is always being monitored regardless of movement can be advantageous to a user. This is the case with the present invention. The need for the present invention arose as a result of the development of animated navigational menus. These menus, displayed on system 100 and monitor 175, can be two dimensional displays configured to appear three-dimensional. This three-dimensional appearance can be accomplished by rotating the targets of the menu and changing their size as they rotate. Within this animated menu are a series of targets, also known as icons, that act as links, or "hotspots" to underlying applications or functions. As is seen in many user interfaces, when cursor 300 is placed on a target that represents an application, function, hotspot, or link, the dialog box 325 is presented displaying a highlighting effect to reflect that an option is available at this location. In traditional systems, the mouse event generated by moving cursor 300 onto a target is what initiates recognition of cursor 300 and the display of dialog box 325 or the highlighting of the selectable option. If cursor 300 were employed in a traditional system and if cursor 300 were at rest on this animated menu, it would never respond, either by presenting dialog box 325 or by some other highlighting effect, to hovering over a link, due to the fact that no mouse events are being generated by the static cursor. With the knowledge of system 100, 200, a typical GUI, typical mouse functionality, and a menu system established, the following discussion focuses on overcoming the deficiencies found in traditional static cursors.

Figure 4:
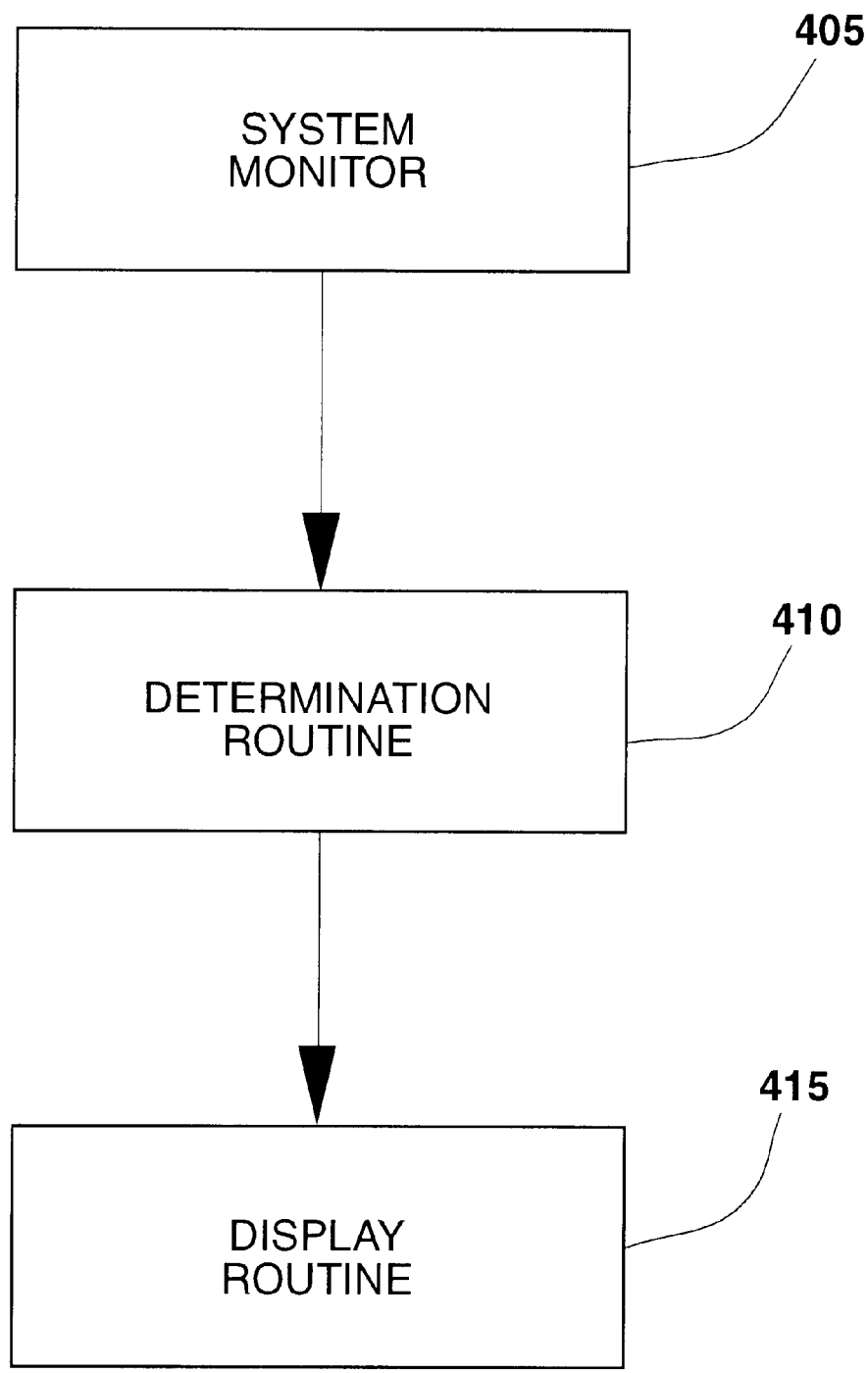
FIG. 4 shows a block diagram of the major components of the implementation of the present invention according to a preferred embodiment.

Referring now to FIG. 4, a block diagram of the main modules implementing the present invention are illustrated. Reference numerals or letters in FIG. 4 which are like, similar, or identical to the reference numerals or letters of FIGS. 1–3 indicate like, similar, or identical components or features. As shown, the present invention can be broken down into three main modules, each handling a different aspect of the present invention's implementation. System Monitoring Module 405 is the first module necessary for the present invention to perform properly. The signals generated by System Monitoring Module 405 are passed to Determination Routine 410 which further processes the signal in a second verification stage. Any signals that make it through Determination Routine 410 are then passed on to, and processed by, Display Routine 415. Further details of the above mentioned routines are provided in the paragraphs that follow.

Figure 5:
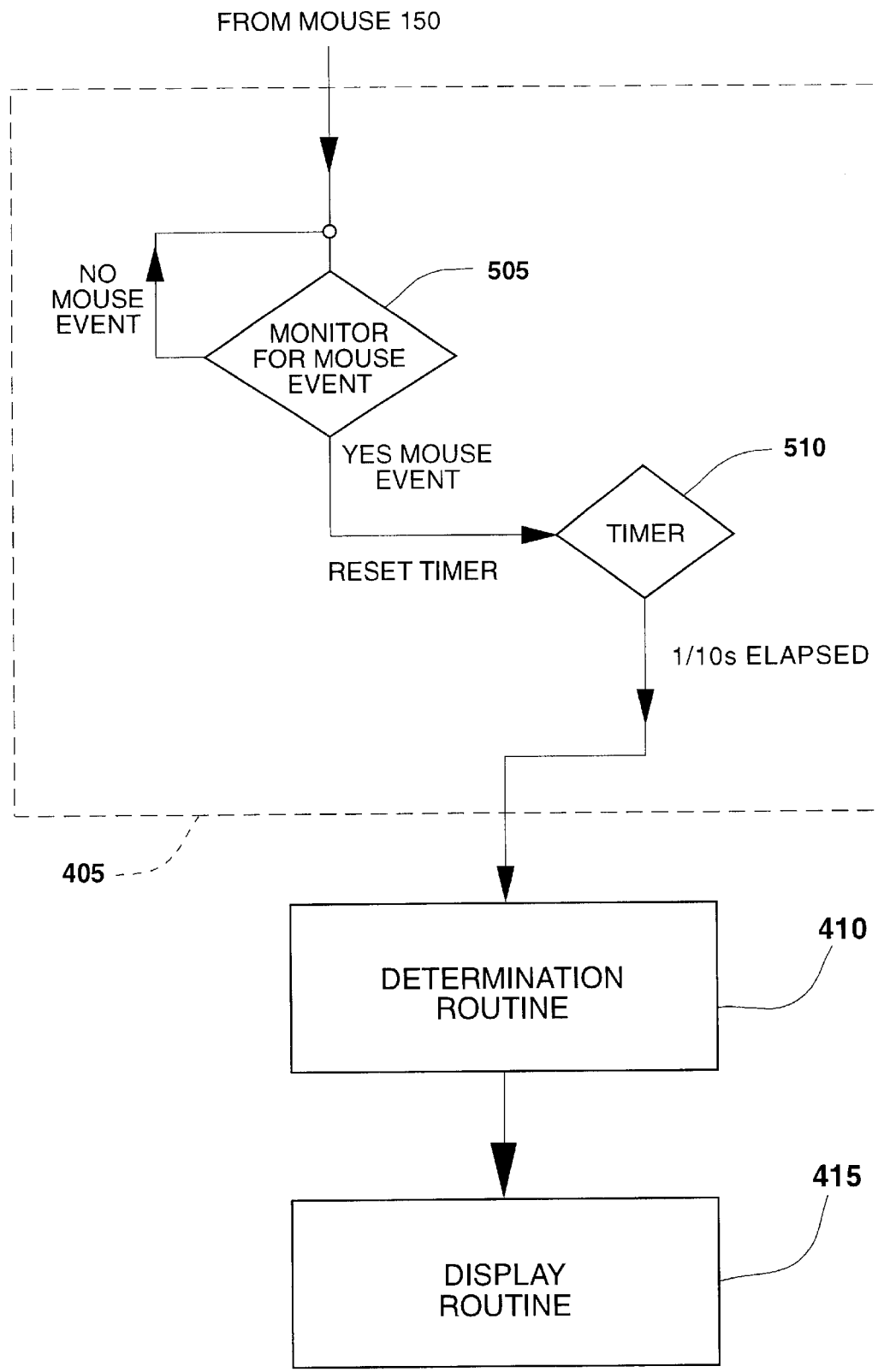
FIG. 5 shows the details of the System Monitor block of FIG. 4 according to a preferred embodiment of the present invention.

Referring now to FIG. 5, details of the System Monitoring Module 405 is illustrated. Reference numerals or letters in FIG. 5 which are like, similar, or identical to the reference numerals or letters of FIGS. 1–4 indicate like, similar, or identical components or features. As is evident from the above discussion concerning the workings of mouse 150, the present invention begins its implementation by monitoring the system for mouse 150 events. This sub-module will monitor system 100 for any mouse events (either movement or button depression) 505, reset timer sub-module 510 included in System Monitoring Module 405, and pass the event signal on to the next module, Determination Routine 410, upon receipt of an event signal. If the mouse 150 event monitoring sub-module 505 does not receive an event signal, it will loop and continue to monitor system 100. While event monitoring sub-module 505 is monitoring the system, timer sub-module 510 is running. This timer sub-module 510 is designed to produce a signal at predetermined intervals of time. This signal can best be defined as a pseudo-event. The purpose of this signal is twofold. First, it is intended to tell the next module, Determination Routine module 410, to begin its work; and second, it is intended to keep system 100 in communication with cursor 300.

Figure 6:
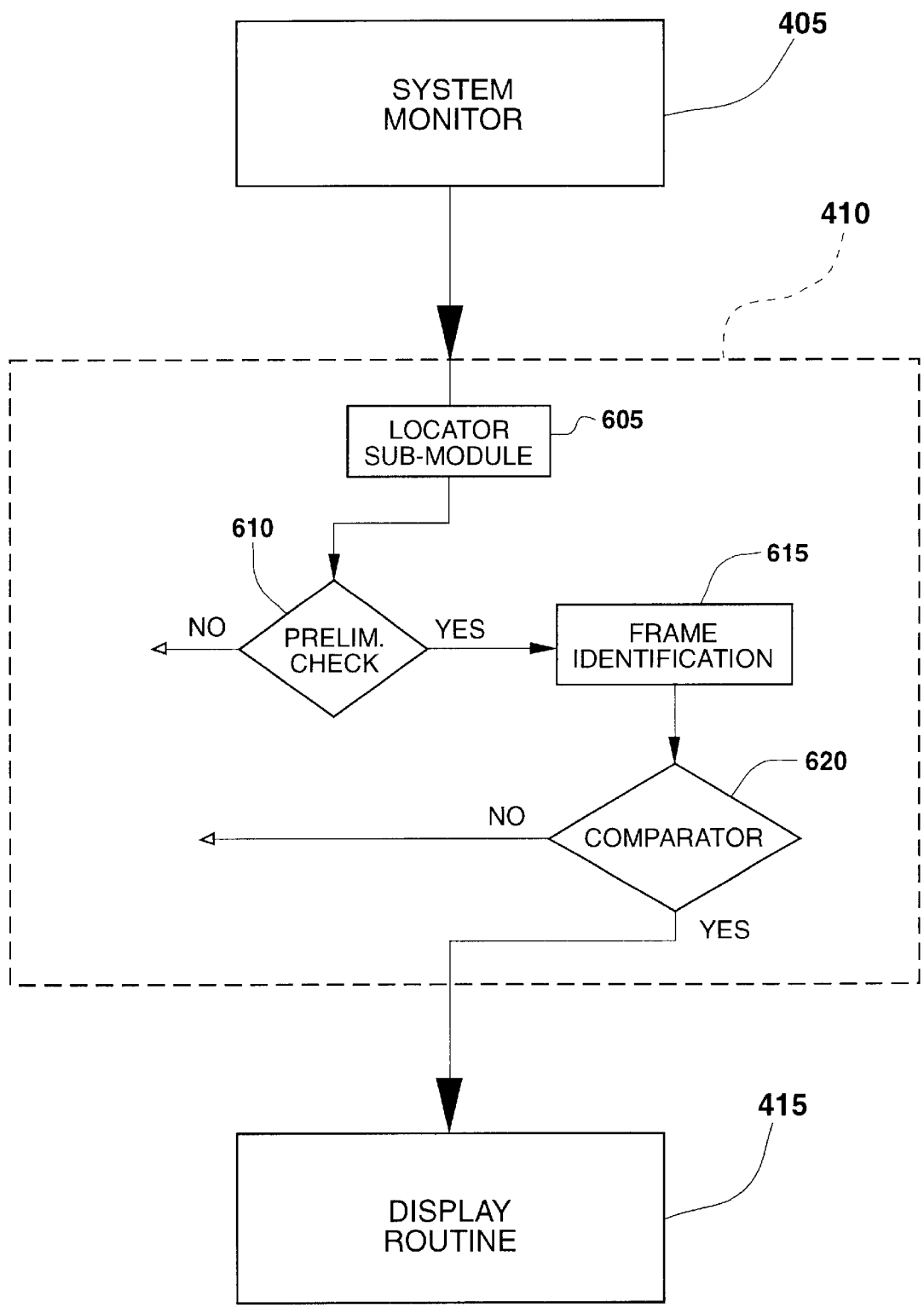
FIG. 6 shows the details of the Determination Routine block of FIG. 4 according to a preferred embodiment of the present invention.

Referring next to FIG. 6, details of Determination Routine 410 is illustrated. Reference numerals or letters in FIG. 6 which are like, similar, or identical to the reference numerals or letters of FIGS. 1–5 indicate like, similar, or identical components or features. Upon receipt of either an actual event signal or a pseudo-event signal, Determination Routine 410 begins its work by launching locator sub-module 605. Locator sub-module 605 then determines the coordinates of the cursor's 300 location. With these coordinates stored, preliminary check sub-module 610 accesses an area of the system's memory or storage, also considered a data file of coordinates, which contains the coordinates of the plane in which the animated menu is displayed. A plane is specified due to the fact that a menu does not typically cover an entire display space. With cursor 300 coordinates and plane coordinates at hand, preliminary check sub-module 610 compares the two coordinate sets to determine whether or not the cursor is contained within the plane of the animated menu. If cursor 300 is determined to not be contained within the plane of the animated menu, the event signal is discarded. If the cursor is determined to be within the plane of the animated menu, a more detailed check is required. This detailed check of the cursor's 300 coordinates is performed after frame identification sub-module 615 accesses a file which contains the coordinates of the targets within the current frame of video being used to display the animated menu. Once the coordinates of the targets have been accessed, a second comparison is made, by comparator sub-module 620, between the coordinates of cursor 300 and the coordinates of the targets in the specified frame of the video sequence to determine if there is an overlap between any of the targets and cursor 300. If an overlap is determined to exist, Determination Routine 410 then signals Display Routine 415. If an overlap is not determined to exist, Determination Routine 410 discards the event signal and the recently acquired target coordinate data. In an alternate embodiment of the present invention, the data file containing the location coordinates of the animated menu is developed real time. In other words, the data file creation process includes determining what the current operating environment is and what options are available at that given moment. Once a current menu has been created, a data file can then be developed which is indicative of the selectable target locations in the current display. This data file can be updated, in this alternate embodiment, as the operating environment changes and the displayed targets change.

Still referring to FIG. 6, once a determination has been made that the cursor overlaps one of the targets in the animated menu, a notification needs to be generated for the user. As mentioned above, user interfaces and the like have customarily highlighted the selectable option or displayed dialog box 325 when cursor 300 is placed on or hovers over a hotspot in a display. Display Routine 415, of the present invention, is included for just that purpose. Once Display Routine 415 receives a signal from Determination Routine 410, the Display Routine 415 will then proceed to highlight the selectable option produce dialog box 325, thereby creating, at least conceptually, a notification cursor. Dialog box 325 design components and highlighting options are merely design choices, and specific implementations are left to the discretion of the programmer.

Figure 7:
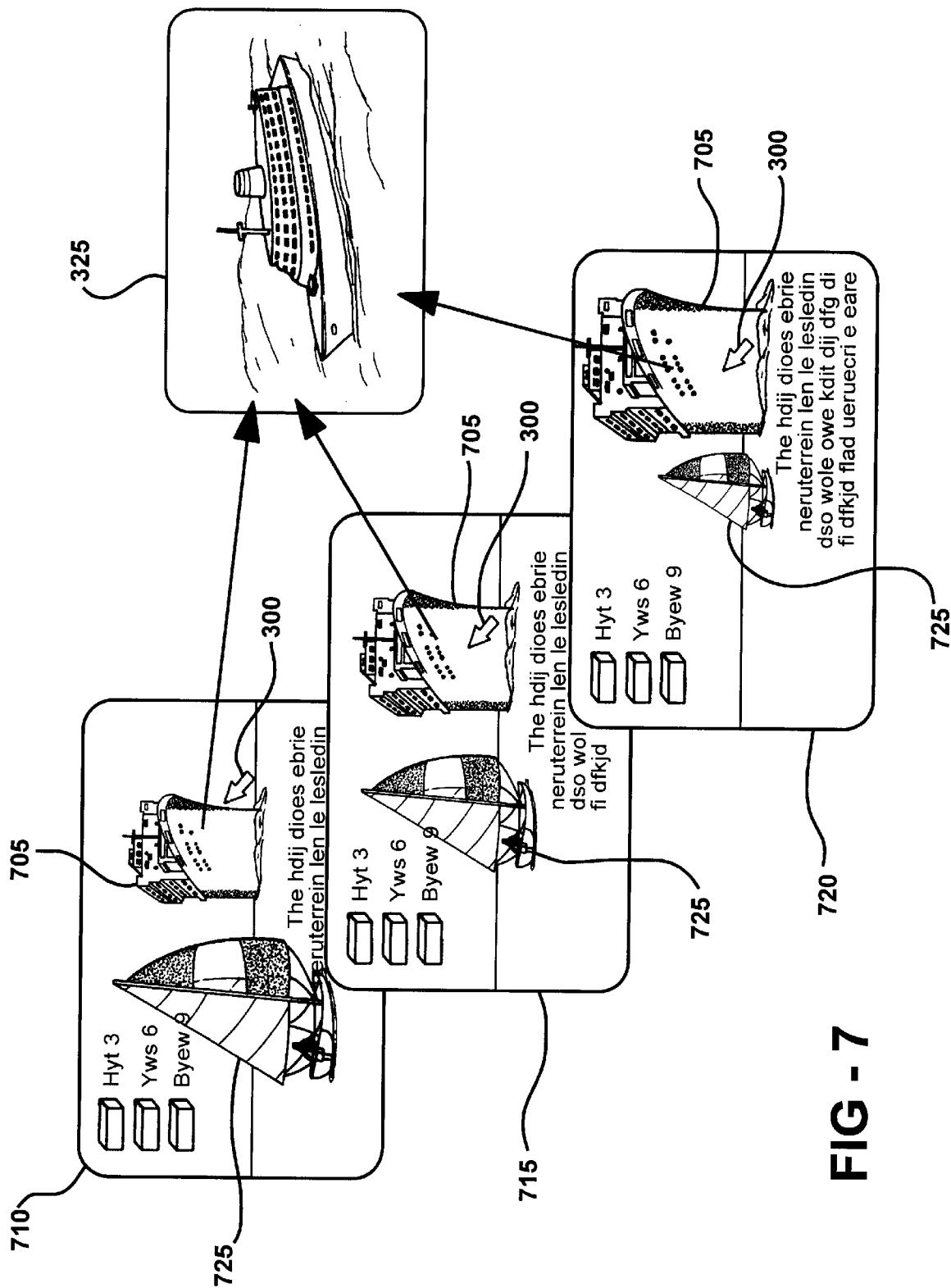
FIG. 7 illustrates a sequence of frames employing a preferred embodiment of the present invention.

Referring now to FIG. 7, an illustration of an animated menu employing the capabilities of the present invention is shown. Reference numerals or letters in FIG. 7 which are like, similar, or identical to the reference numerals or letters of FIGS. 1–7 indicate like, similar, or identical components or features. As illustrated, cruise ship 705 appears to be at a distance in frame 710. In this embodiment, when a user places cursor 300 on cruise ship 705, dialog box 325 appears providing additional information about cruise ship 705 to the user. In subsequent frames 715, and 720, cruise ship 705 gets larger and larger giving it the appearance that it is coming towards the user. By employing the present invention, static cursor 300 continues to provide the user with dialog box 325 despite the fact that cruise ship 325 is changing position, size, perspective, etc. Therefore, the moving hotspot that lies within the outline of cruise ship 705 is being tracked by static cursor 300. Sail boat 725 also changes position, size, and perspective as one moves from frame 710, to frame 715, to frame 720. A similar dialog box 325 results when a user places cursor 300 on sail boat 725. It is also possible to have sail boat 725 appear to sail in front of cruise ship 705 at which point, if the sail boat 725 sailed under the static cursor 300 location, the dialog box 325 would switch content to show details associated with the sail boat 725.

Figure 8B:
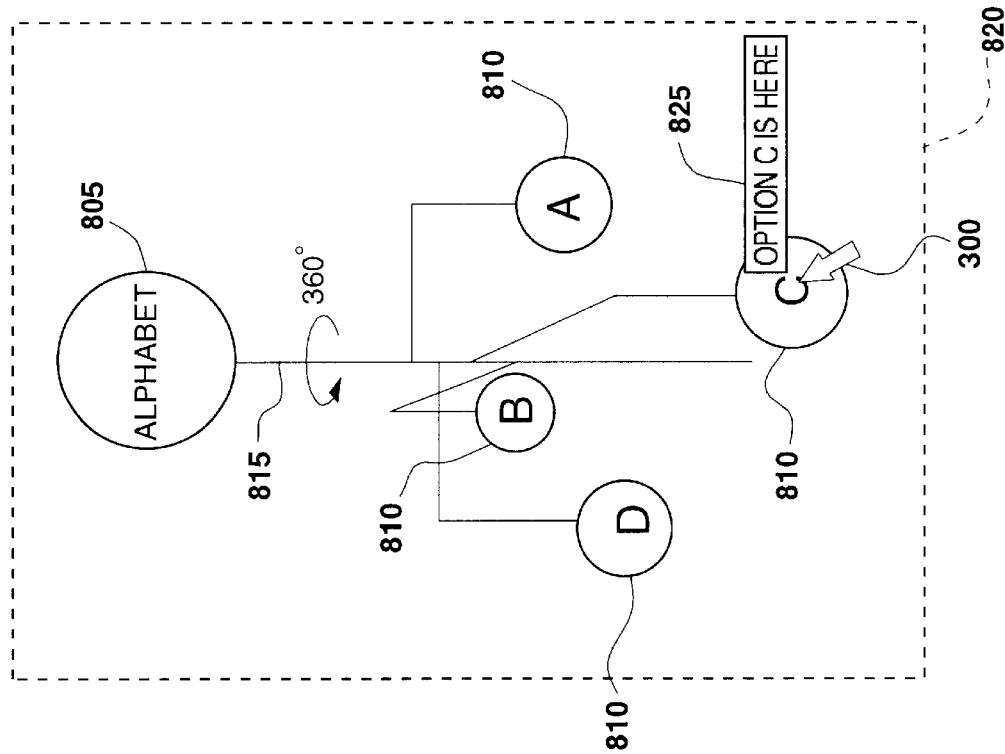
FIG. 8B illustrates a preferred response according to a preferred embodiment of the present invention of the display in FIG. 8A employing the present invention.
Figure 8A:
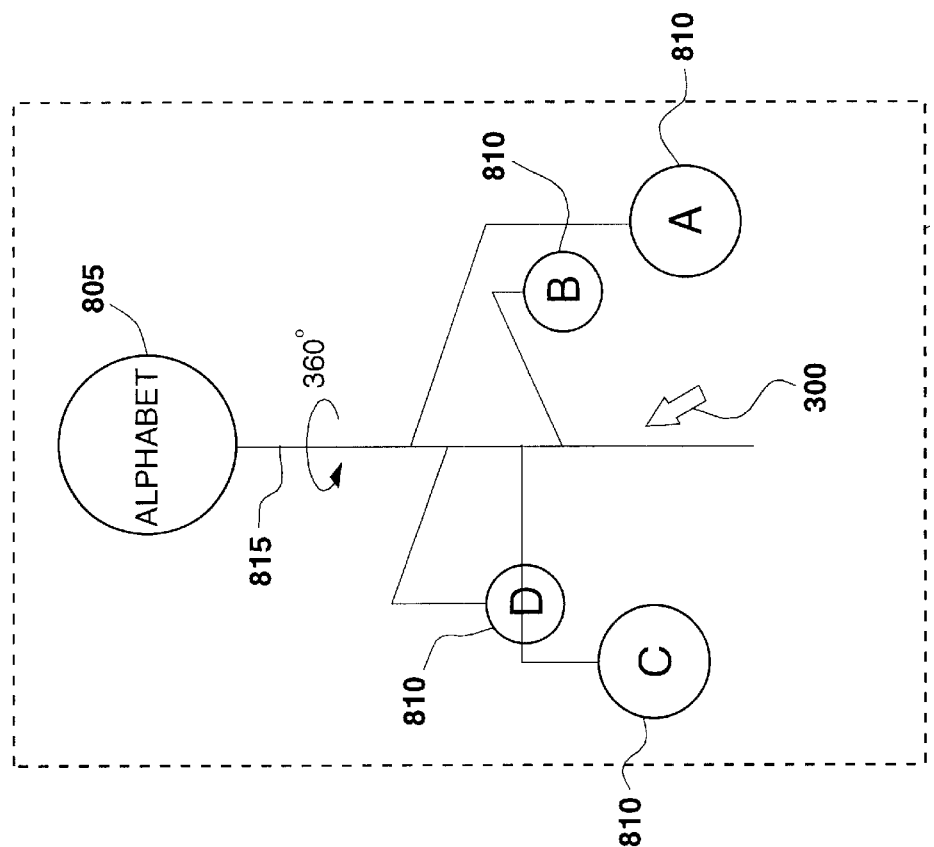
FIG. 8A illustrates a portion of a display, employing the present invention, containing the plane in which a 3-D menu is located according to a preferred embodiment of the present invention.

Referring now to FIGS. 8A and 8B, the present invention employed with a simulated three-dimensional menu and a cursor is illustrated. Reference numerals or letters in FIGS. 8A and 8B which are like, similar, or identical to the reference numerals or letters of FIGS. 1–7 indicate like, similar, or identical components or features. FIG. 8A illustrates menu 805 configured to be displayed in three dimensions by spinning targets 810 in a counterclockwise manner about axis 815. Menu 805, identified as Alphabet, is comprised of targets 810, labeled A, B, C, and D, which are attached to "main" menu Alphabet in the fashion of a hanging or floating mobile. The spinning of targets 810 is further enhanced by changing the size of targets 810 as they rotate, thus giving them and their rotation a three-dimensional effect. Cursor 300, which has been at rest in its present location for a significant period of time, is located within plane 820 of menu 805 but is not located on one of the targets 810. Therefore, no highlighting effects or dialog boxes 325 are present. FIG. 8B illustrates a preferred response of the present invention. As can be discerned, menu 805 and targets 810 are rotating about axis 815 and cursor 300 is stationary. As one of targets 810 rotates, it occupies overlapping space on the display with cursor 300. In FIG. 8B, the target 810 labeled C rotates into overlapping display with the cursor 300. As target 810 labeled C is rotated about the display in such a way that the coordinates of cursor 300 are occupying coordinates contained in the boundaries of target 810 labeled C, the present invention detects this status and appropriately displays dialog box 825 to notify a user that cursor 300 is on a hotspot. As menu 805 continues to rotate, the target 810 labeled C will move out of the coordinates co-occupied by cursor 300, and at that time, dialog box 825 will disappear, leaving cursor 300 on the display without dialog box 825, as previously shown in FIG. 8A.

In summary, the present invention is designed to monitor a cursor, even when at rest, to enable the system to identify hotspots moving about a display. The present invention accomplishes this task by monitoring the cursor even when it is in a static state, by using a timer to regularly poll the cursor's position. Each time that the coordinates of the cursor are determined, a comparison is done to discern whether the cursor is in the plane of an animated menu. If it is determined that the cursor is in the plane of an animated menu, a further check is done to determine if a target is in the overlapping area of the cursor's coordinates. If a target is present, the present invention will highlight the selectable option or present a dialog box to notify the user that the cursor is located on a hotspot, or selectable option. It is understood that the plane and target comparisons can be executed in a one-step target comparison. However, the present invention implements a two-step approach to minimize the processing requirements for constantly obtaining target information, which is more data processing intensive than constantly obtaining plane information.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–8. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer or encoded or embodied in a signal, such as an analog or digital signal, embodied in a propagation medium and transmitted over the propagation medium by a user. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

What is claimed is:

1. A method, comprising the steps of:
   displaying at least one selectable target on at least a portion of a display screen;
   displaying a cursor on at least a portion of the display screen;
   enabling movement of the at least one selectable target about the display screen;
   tracking a position of the at least one selectable target as it moves about the display screen; and
   comparing the position of the at least one selectable target to a position of the cursor on the display screen, wherein the tracking step and comparing step occur regardless of cursor movement or activity.

2. The method, as defined in claim 1, further comprising the step of determining whether the position of the at least one selectable target is intended to co-occupy a location on the display screen in common with the position of the cursor.

3. The method, as defined in claim 2, further comprising the step of providing focus to the at least one selectable target in response to a determination that the at least one selectable target is intended to co-occupy a location on the display screen in common with the position of the cursor.

4. The method, as defined in claim 3, further comprising triggering an event associated with the at least one selectable target in response to determination of intended co-occupation between the at least one selectable target and the cursor.

5. The method, as defined in claim 3, further comprising the step of providing notification to a user in response to determination of intended co-occupation between the at least one selectable target and the cursor.

6. The method, as defined in claim 4, wherein the determining step further comprises accessing a data file comprising data indicative of the intended position of the at least one selectable target on the display screen.

7. The method, as defined in claim 1, wherein movement of the at least one selectable target is capable of being displayed in a manner to simulate three dimensional movement on the display screen.

8. A method, comprising the steps of:
   displaying at least one selectable target on at least a portion of a display screen;
   displaying a cursor on at least a portion of the display screen;

enabling movement of the at least one selectable target about the display screen;

tracking a position of the at least one selectable target as it moves about the display screen; and comparing the position of the at least one selectable target to a position of the cursor on the display screen, wherein the tracking step and comparing step occur continually at predetermined intervals of time.

9. An information handling system readable medium tangibly embodying a program of instructions comprising the steps of:

displaying at least one selectable target on at least a portion of a display screen;

displaying a cursor on at least a portion of the display screen;

enabling movement of the at least one selectable target about the display screen;

tracking a position of the at least one selectable target as it moves about the display screen; and comparing the position of the at least one selectable target to a static position of the cursor on the display screen, wherein the tracking step and comparing step occur regardless of cursor movement or activity.

10. The information handling system readable medium, as defined in claim 9, further comprising the step of determining whether the position of the at least one selectable target is intended to co-occupy a location on the display screen in common with the position of the cursor.

11. The information handling system readable medium, as defined in claim 10, further comprising the step of providing focus to the at least one selectable target in response to a determination that the at least one selectable target is intended to co-occupy a location on the display screen in common with the position of the cursor.

12. The information handling system readable medium, as defined in claim 11, further comprising triggering an event associated with the at least one selectable target in response to determination of intended co-occupation between the at least one selectable target and the cursor.

13. The information handling system readable medium, as defined in claim 11, further comprising the step of providing notification to a user in response to determination of intended co-occupation between the at least one selectable target and the cursor.

14. The information handling system readable medium, as defined in claim 10, wherein the determining step further comprises accessing a data file comprising data indicative of the intended position of the at least one selectable target on the display screen.

15. The information handling system readable medium, as defined in claim 9, wherein movement of the at least one selectable target is capable of being displayed in a manner to simulate three dimensional movement on the display screen.

16. An information handling system readable medium tangibly embodying a program of instructions comprising the steps of:

displaying at Least one selectable target on at least a portion of a display screen;

displaying a cursor on at least a portion of the display screen;

enabling movement of the at least one selectable target about the display screen;

tracking a position of the at least one selectable target as it moves about the display screen; and comparing the position of the at least one selectable target to a static position of the cursor on the display screen, wherein the tracking step and comparing step occur continually at predetermined intervals of time.

17. A system comprising:

at least one processor;

memory operably associated with said processor;

a cursor control device configured to control a cursor on a display screen; and a program of instructions comprising the steps of:

displaying at least one selectable target on at least a portion of a display screen;

displaying a cursor on at least a portion of the display screen;

enabling movement of the at least one selectable target about the display screen;

tacking a position of the at least one selectable target as it moves about the display screen; and comparing the position of the at least one selectable target to a position of the cursor on the display screen, wherein the tracking step and comparing step occur regardless of cursor movement or activity.

18. The system, as defined in claim 17, further comprising the step of determining whether the position of the at least one selectable target is intended to co-occupy a location on the display screen in common with the position of the cursor.

19. The system, as defined in claim 18, further comprising the step of providing focus to the at least one selectable target in response to a determination that the at least one selectable target is intended to co-occupy a location on the display screen in common with the position of the cursor.

20. The system, as defined in claim 19, further comprising triggering an event associated with the at least one selectable target in response to determination of intended co-occupation between the at least one selectable target and the cursor.

21. The system, as defined in claim 19, further comprising the step of providing notification to a user in response to determination of intended co-occupation between the at least one selectable target and the cursor.

22. The system, as defined in claim 18, wherein the determining step further comprises accessing a data file comprising data indicative of the intended position of the at least one selectable target on the display screen.

23. The system, as defined in claim 17, wherein movement of the at least one selectable target is capable of being displayed in a manner to simulate three dimensional movement on the display screen.

24. A system comprising:

at least one processor;

memory operably associated with said processor;

a cursor control device configured to control a cursor on a display screen; and a program of instructions comprising the steps of:

displaying at least one selectable target on at least a portion of a display screen;

displaying a cursor on at least a portion of the display screen;

enabling movement of the at least one selectable target about the display screen;

tracking a position of the at least one selectable target as it moves about the display screen; and comparing the position of the at least one selectable target to a position of the cursor on the display screen, wherein the tracking step and comparing step occur continually at predetermined intervals of time.

25. A method, comprising:

displaying at least one selectable target on at least a portion of a display screen, the at least one selectable target engaged in movement on the display screen;

monitoring the at least one selectable target engaged in movement; and comparing position of the monitored selectable target to a static cursor position, wherein comparing position of the monitored selectable target to the static cursor position is initiated without cursor activity.

* * * * *